US011007889B2

(12) United States Patent
Bailey et al.

(10) Patent No.: US 11,007,889 B2
(45) Date of Patent: May 18, 2021

(54) AUTOMATIC, HANDS-FREE CONDUCTIVE CHARGING SYSTEM FOR ELECTRIC VEHICLE APPLICATIONS

(71) Applicant: FORD GLOBAL TECHNOLOGIES, LLC, Dearborn, MI (US)

(72) Inventors: Hannah Bailey, Dearborn, MI (US); Christopher W. Bell, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 16/548,312

(22) Filed: Aug. 22, 2019

(65) Prior Publication Data

US 2021/0053451 A1    Feb. 25, 2021

(51) Int. Cl.
| | | |
|---|---|---|
| *B60L 53/16* | (2019.01) | |
| *B60L 53/22* | (2019.01) | |
| *B60L 53/18* | (2019.01) | |
| *B60L 53/36* | (2019.01) | |
| *H01M 10/625* | (2014.01) | |

(52) U.S. Cl.
CPC ............. *B60L 53/16* (2019.02); *B60L 53/18* (2019.02); *B60L 53/22* (2019.02); *B60L 53/36* (2019.02); *H01M 10/625* (2015.04)

(58) Field of Classification Search
CPC ....................................................... B60L 53/16
USPC ........................................................... 320/109
See application file for complete search history.

(56) References Cited

U.S. PATENT DOCUMENTS

| | | | | |
|---|---|---|---|---|
| 8,917,056 | B2 * | 12/2014 | Jung | B60L 53/126 |
| | | | | 320/108 |
| 9,527,403 | B2 | 12/2016 | Mardall et al. | |
| 9,873,347 | B2 | 1/2018 | Brown | |
| 10,081,262 | B2 | 9/2018 | Nagel et al. | |
| 2003/0120442 | A1 * | 6/2003 | Pellegrino | G07F 15/005 |
| | | | | 702/60 |
| 2011/0066515 | A1 * | 3/2011 | Horvath | G06Q 20/204 |
| | | | | 705/17 |
| 2015/0097529 | A1 * | 4/2015 | Lacour | B60L 53/35 |
| | | | | 320/109 |
| 2016/0332525 | A1 * | 11/2016 | Kufner | B60L 53/30 |
| 2018/0152031 | A1 * | 5/2018 | Zhai | H02J 7/0013 |
| 2019/0016218 | A1 * | 1/2019 | Haag | B60L 53/66 |

\* cited by examiner

*Primary Examiner* — Jerry D Robbins
(74) *Attorney, Agent, or Firm* — David B. Kelley; Brooks Kushman P.C.

(57) ABSTRACT

An automated charging system for a vehicle includes a telescoping mechanism configured to move a charge connector in a vertical direction. The charging system includes a rack and pinion mechanism that is configured to move the telescoping mechanism. The charging system is configured to translate horizontal motion of the rack to vertical motion of the telescoping mechanism.

20 Claims, 5 Drawing Sheets

AUTOMATIC, HANDS-FREE CONDUCTIVE CHARGING SYSTEM FOR ELECTRIC VEHICLE APPLICATIONS

TECHNICAL FIELD

This application is generally related to an automated charging system for electrified vehicles.

BACKGROUND

Electrified vehicles include a traction battery that may be recharged by connecting to an external charger. The electrified vehicle includes a charge port or plug for receiving a charge connector from the external charger. For convenience of the human operator, the charge port is located on a body panel. Charging systems typically rely on manual coupling of the charge connector to a vehicle charge plug to initiate charging. As a result, charging systems are generally designed to facilitate the manual coupling.

SUMMARY

A charge station for a vehicle includes a telescoping mechanism configured to direct a conductive charge connector in a vertical direction. The charge station further includes a rack configured to move generally perpendicular to a direction of motion of the telescoping mechanism and a bendable connecting member coupled to the rack and the telescoping mechanism. The charge station further includes a guide element configured to constrain the bendable connecting member to traveling in a predetermined path that includes directing the bendable connecting member from traveling in a same direction as the rack to traveling in the direction of motion of the telescoping mechanism. The charge station further includes an electric motor coupled to a pinion that cooperates with the rack to move the rack and a controller programmed to operate the electric motor to move the telescoping mechanism.

The following features may be present in some configurations of the charge station. The bendable connecting member may be coupled to a bottom surface of the rack over a predetermined length of the rack and is configured to cooperate with the guide element to limit motion of the rack to a single axis of motion. The bendable connecting member may define slots along a length of the bendable connecting member and the guide element may include one or more brackets that cooperate with the slots to constrain the bendable connecting member to the predetermined path. At least a portion of the guide element may define an arcuate path for the bendable connecting member. At least a portion of the guide element may be a conduit that surrounds the bendable connecting member. The charge station may further include a rack guide that is configured to cooperate with the rack to limit motion of the rack to a single axis of motion. A segment of the of the telescoping mechanism that includes the conductive charge connector may have sloped sides to cooperate with a connector guide of a vehicle. The charge station may further include a heating element that is configured to provide heat, when activated, to portions of the telescoping mechanism that could prevent movement in a presence of frozen water. The bendable connecting member may be a stranded cable. The bendable connecting member may be plastic.

A charging system for a vehicle includes a telescoping mechanism configured to direct a conductive charge connector in a vertical direction and an electric motor coupled to a pinion. The charging system further includes a bendable rack coupled at a first end to the telescoping mechanism and configured to cooperate with the pinion. The charging system further includes a rack guide configured to constrain the bendable rack to traveling in a predetermined path that includes directing the bendable rack from traveling in a horizontal direction at the pinion to traveling in the vertical direction at the first end such that the telescoping mechanism moves in the vertical direction as the bendable rack moves. The charging system further includes a controller programmed to operate the electric motor to move the telescoping mechanism.

The bendable rack may be plastic. The rack guide may define an arcuate path for the bendable rack. The rack guide may encircle at least a portion of the bendable rack. a segment of the of the telescoping mechanism that includes the conductive charge connector may have sloped sides to cooperate with a connector guide of a vehicle during deployment of the telescoping mechanism. The charging system may further include a heating element configured to provide heat to movable portions of the telescoping mechanism when activated.

An above-ground charging system for a vehicle comprising a telescoping mechanism configured to direct a conductive charge connector in a vertical direction, a rack configured to move generally perpendicular to a direction of motion of the telescoping mechanism, and a bendable connecting member coupled to the rack and the telescoping mechanism. The charging system may further include a conduit surrounding at least a portion of the bendable connecting member and configured to direct the bendable connecting member from traveling in a same direction as the rack to traveling in the direction of motion of the telescoping mechanism. The charging system may further include an electric motor coupled to a pinion that cooperates with the rack to cause movement of the rack, a heating element disposed proximate the telescoping mechanism and configured to provide heat, when activated, to portions of the telescoping mechanism that could prevent movement in a presence of frozen water, and a movable door coupled to an electrical actuator and configured to cover the conductive charge connector when the telescoping mechanism is in a retracted position. The charging system may further include a controller programmed to operate the heating element, electrical actuator, and the electric motor to position the conductive charge connector to charge a vehicle responsive to a demand for vehicle charging.

The above-ground charging system may further include guide rails configured to limit lateral motion of the rack to maintain contact between the pinion and teeth of the rack. A segment of the of the telescoping mechanism that includes the conductive charge connector has sloped sides to cooperate with a connector guide of a vehicle during deployment of the telescoping mechanism. The conduit may define an arcuate path for the bendable connecting member.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
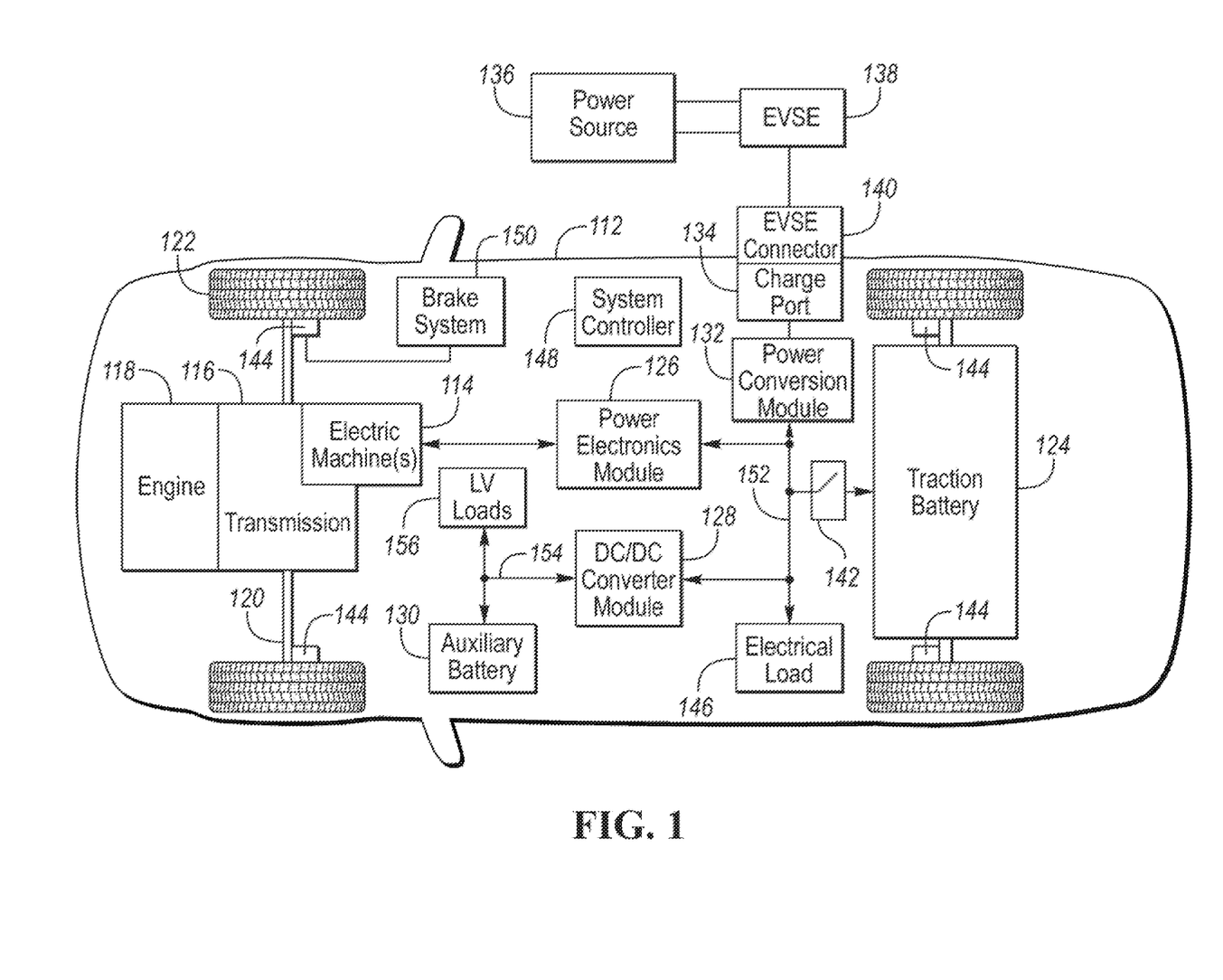
FIG. 1 depicts a possible configuration for an electrified vehicle.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a gearbox or hybrid transmission 116. The electric machines 114 may be capable of operating as a motor and a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and slowing capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A battery pack or traction battery 124 stores energy that can be used by the electric machines 114. The traction battery 124 may provide a high voltage direct current (DC) output. A contactor module 142 may include one or more contactors configured to isolate the traction battery 124 from a high-voltage bus 152 when opened and connect the traction battery 124 to the high-voltage bus 152 when closed. The high-voltage bus 152 may include power and return conductors for carrying current over the high-voltage bus 152. The contactor module 142 may be located in the traction battery 124. One or more power electronics modules 126 (also known as an inverter) may be electrically coupled to the high-voltage bus 152. The power electronics modules 126 are also electrically coupled to the electric machines 114 and provide the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

In addition to providing energy for propulsion, the traction battery 124 may provide energy for other vehicle electrical systems. The vehicle 112 may include a DDC converter module 128 that converts the high voltage DC output from the high-voltage bus 152 to a low-voltage DC level of a low-voltage bus 154 that is compatible with low-voltage loads 156. An output of the DC/DC converter module 128 may be electrically coupled to an auxiliary battery 130 (e.g., 12V battery) for charging the auxiliary battery 130. The low-voltage loads 156 may be electrically coupled to the auxiliary battery 130 via the low-voltage bus 154. One or more high-voltage electrical loads 146 may be coupled to the high-voltage bus 152. The high-voltage electrical loads 146 may have an associated controller that operates and controls the high-voltage electrical loads 146 when appropriate. Examples of high-voltage electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charge station or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for coupling to a charge port 134 of the vehicle 112. The charge port 134 may be any type of port configured to transfer power from the EVSE 138 to the vehicle 112. The charge port 134 may be electrically coupled to an on-board power conversion module or charger. The charger 132 may condition the power supplied from the EVSE 138 to provide the proper voltage and current levels to the traction battery 124 and the high-voltage bus 152. The charger 132 may be electrically coupled to the contactor module 142. The charger 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

Wheel brakes 144 may be provided for slowing the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle slowing. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1, but it may be implied that the vehicle network may connect to any electronic modules that are present in the vehicle 112. A vehicle system controller (VSC) 148 may be present to coordinate the operation of the various components.

In many charging systems, the charge connector 140 is manually connected to the charge port 134 by the vehicle operator. For example, the vehicle operator may retrieve the charge connector 140 from a holder and insert the charge connector 140 into the charge port 134 to facilitate charging of the vehicle. Further, to facilitate the manual placement of the charge connector 140, the charge port 134 is generally located on body panels of the vehicle that are easily accessible to the vehicle operator. For example, the charge port 134 may be located on a side panel near the driver door. An improved system may permit hands-free charging of the vehicle with automatic placement of the charge connector 140 when the vehicle is proximate the EVSE 138.

Figure 2:
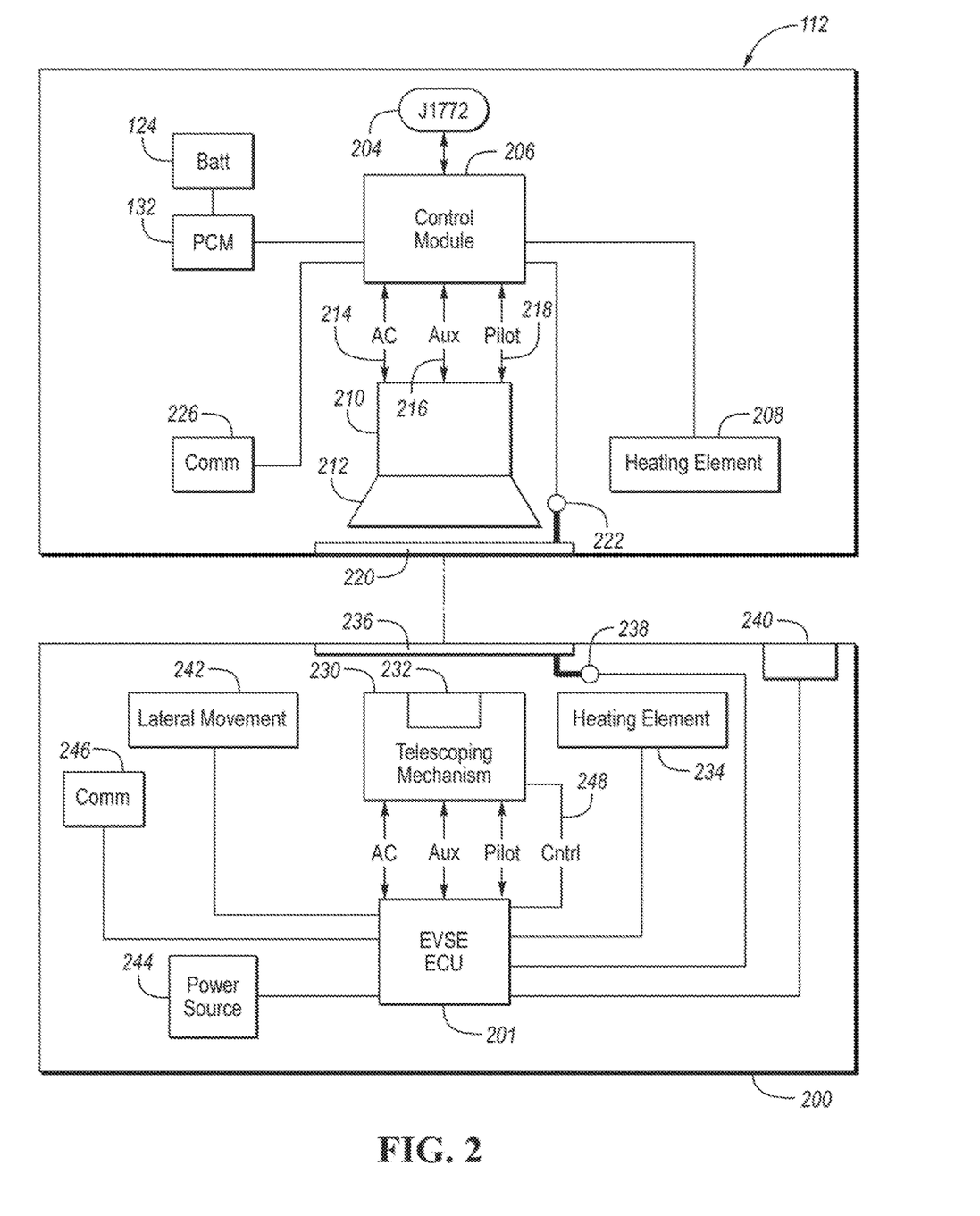
FIG. 2 depicts a block diagram of charge system related components in an electrified vehicle and an automated charging station.

The EVSE 138 may be improved to include an automated charge station or system for connecting to the vehicle. An automated EVSE system may include various features for automating and improving the vehicle charging process. FIG. 2 depicts a possible block diagram of the vehicle 112 and an automated EVSE charge station/system 200. The automated EVSE system 200 may include an EVSE electronic control unit (ECU) 201. The EVSE ECU 201 may include a processor that is configured to execute program instructions. The EVSE ECU 201 may include volatile and non-volatile memory for storing programs and data. The EVSE ECU 201 may be programmed to implement the methods and strategies described herein. The EVSE ECU 201 may further include interface circuitry for connecting to sensors and actuators that are described herein.

The electrified vehicle 112 may include a vehicle charge control module 206. The vehicle charge control module 206 may include a processor that is configured to execute program instructions. The vehicle charge control module 206 may include volatile and non-volatile memory for storing programs and data. The vehicle charge control module 206 may be programmed to implement the methods and strategies described herein. The vehicle charge control module 206 may further include interface circuitry for connecting to sensors and actuators that are described herein.

The electrified vehicle 112 may include an underside charge plug 210 that is configured to receive a charge connector 232 from the automated EVSE system 200. The underside charge plug 210 may be accessible from an underside of the vehicle 112. The underside charge plug 210 may be a SAE J1772-compatible plug. The underside charge plug 210 may be electrically coupled to the vehicle charge control module 206. A pilot conductor 218, a proximity conductor 216, and AC power conductors 214 may provide a conductive interface between the underside charge plug 210 and the vehicle charge control module 206. The pilot conductor 218, the proximity conductor 216, and the AC power conductor 214 may operate as defined by the SAE J1772 standard. The vehicle charge control module 206 may be programmed to send and receive signals on the proximity conductor 216 and the pilot conductor 218 to provide communication between the vehicle charge control module 206 and the EVSE ECU 201.

The electrified vehicle 112 may further include a charge connector guide 212 that is configured to guide the charge connector 232 to the underside charge plug 210. In some configurations, the charge connector guide 212 includes surfaces that slope away from the underside charge plug 210. The sloped surfaces may be configured to guide the charge connector 232 to the underside charge plug 210 as the charge connector 232 moves toward the underside charge plug 210. For example, the charge connector guide 212 may be funnel-shaped to direct the charge connector 232 during coupling. The charge connector guide 212 may be configured such that the underside charge plug 210 and the charge connector 232 do not have to be perfectly aligned to establish a charging connection.

The electrified vehicle 112 may further include an underside door panel 220 that is configured to cover and conceal the underside charge plug 210 when not being used. The position of the underside door panel 220 may be changed by operation of an underside door actuator 222. The underside door actuator 222 may be electrically coupled to the vehicle charge control module 206. The vehicle charge control module 206 may be programmed to actuate the underside door actuator 222 to move the underside door panel 220 to an open or a closed position. The electrified vehicle 112 may include a heating element 208 that is configured to provide heat near the underside door panel 220 and/or the underside charge plug 210. The heating element 208 may be electrically coupled to the vehicle charge control module 206. The heating element 208 may include one or more resistive heating elements that are positioned at locations to be heated. The heating element 208 may be operated to ensure that the underside door panel 220 can be opened and closed and to prevent ice buildup around the underside charge plug 210. For example, the heating element 208 may include a resistive heating element installed proximate the underside charge plug 210 to facilitate prevention of ice build up near the underside charge plug 210. The heating element 208 may further include a resistive heating element installed proximate the underside door panel 220 to prevent ice buildup that could limit motion of the underside door panel 220 in the presence of freezing water.

The vehicle charge control module 206 may transfer the power transmitted on the AC power conductors 214 to the power conversion module 132. The vehicle charge control module 206 may be programmed to operate the power conversion module 132 to convert the AC voltage to a DC voltage for the traction battery 124. The vehicle 112 may include a manual charge connector 204 to maintain compatibility with manual charging systems. For example, the manual charge connector 204 may be located on a side panel of the vehicle 112.

The vehicle 112 may further include a communication interface 224 for communicating with the automated EVSE system 200. The automated EVSE system 200 may include an EVSE communication interface 246. The communication interfaces may include a wireless communication interface. The communication interfaces may include a Bluetooth transceiver with an associated antenna for communication via the Bluetooth standard. The communication interfaces may include a wireless router including a transceiver/antenna for communication via WiFi (IEEE 802.11) standards. The communication interfaces may include a Near Field Communication (NFC) system for supporting NFC communication. For example, the NFC system may be compatible with standards such as ISO/IEC 144443 and ISO/IEC 18092. A wireless communication protocol may be established for exchanging data between the vehicle charge control module 206 and the EVSE ECU 201.

The automated EVSE system 200 may include an automated mechanism for connecting to a charge plug of the vehicle 112. The automated EVSE system 200 may include a telescopic charge connector mechanism 230. The telescopic charge connector mechanism 230 may be configured to raise and lower a charge connector 232 to establish contact with the underside charge plug 210 when the vehicle 112 is positioned at the automated EVSE system 200. The telescopic charge connector mechanism 230 may be electrically actuated by one or more control signals 248 that are generated by the EVSE ECU 201. For example, the telescopic charge connector mechanism 230 may include an electric motor that is driven by one of the control signals 248. The EVSE ECU 201 may provide a voltage or current on the corresponding control signal 248 to drive the electric motor in a direction based on the polarity of the voltage or current. A top surface of the telescopic charge connector mechanism 230 may define a sloped surface for cooperating with the charge connector guide 212 of the vehicle 112 to guide the charge connector 232 to the underside charge port 210 during deployment of the telescoping charge connector mechanism 230.

The telescopic charge connector mechanism 230 may be commanded to retract in a non-deployed mode or retracted mode such that the telescopic charge connector mechanism 230 is enclosed in a housing of the automated EVSE system 200. In the retracted position, electrical power may be isolated from the charge connector 232 and the telescopic charge connector mechanism 230 may be stored to minimize contact with vehicles or other objects in the environment. In a deployed or extended mode of operation, the telescopic charge connector mechanism 230 may extend from the automated EVSE system housing to lift the charge connector 232 toward the charge connector 210 of the vehicle. In the extended mode, the telescopic charge connector mechanism 230 may be configured to engage the charge connector 232 to the underside charge port 210 in order to transfer power to the vehicle 112.

The telescopic charge connector mechanism 230 may further include one or more sensors to provide feedback signals to the EVSE ECU 201. For example, the telescopic charge connector mechanism 230 may include a sensor that provides a signal indicative of the amount of extension of the telescoping arm. In some configurations, the sensors may include a signal corresponding to the travel limits of the telescoping arm (e.g., fully retracted and fully extended).

The automated EVSE system 200 may include a door panel 236 and a door mechanism actuator 238 that are configured to cover and conceal the charge connector 232 when not in use (e.g., retracted or non-deployed mode). For example, the door mechanism actuator 238 may be commanded to move the door panel 236 to a closed position when the telescopic charge connector mechanism 230 is retracted to protect the charge connector 232 from debris that may be present in the environment. The door panel 236 may be a sliding panel configured to allow the door panel 236 to move laterally. In other configurations, the door panel 236 may be constructed of a material that can be rolled and coupled to a spool and be moved laterally in a track. The EVSE ECU 201 may output a signal to the door mechanism actuator 238 to cause the door panel 236 to move between open and closed positions. In some examples, the door mechanism actuator 238 may be an electric motor. The door mechanism actuator 238 may further include a gear configured to interface with a rack that is coupled to the door panel 236. For example, the door panel 236 may be coupled to a rack and pinion mechanism for moving the door panel 236.

The telescopic charge connector mechanism 230 may be exposed to water and moisture when in the extended position. In cold weather, water on the telescopic charge connector mechanism 230 could freeze during a long period of inactivity and cause difficulty in extending or retracting the telescopic charge connector mechanism 230. The automated EVSE system 200 may include one or more heating elements 234 to prevent freezing of components in cold weather. For example, the telescopic charge connector mechanism 230 may include heating elements 234 positioned around each telescoping segment to prevent freezing of water. The heating elements 234 may be configured to provide heat near elements of the automated EVSE system 200 that may be subject to freezing. The heating elements 234 may include resistive heating elements placed in appropriate locations within the automated EVSE system 200. For example, one or more of the heating elements 234 may be installed proximate the joints of the telescopic charge connector mechanism 230 to ensure movement of the telescopic arm. The heating elements 234 may be installed near moving surfaces of the door panel 236 to ensure movement of the door panel 236. The heating elements 234 may be operated by the EVSE ECU 201. The heating elements 234 may be resistive heating elements that increase temperature when a current is passed through.

The automated EVSE system 200 may include features for identifying the presence and position of a vehicle. For example, the automated EVSE system 200 may include one or more wheel stops for longitudinal location of the vehicle when it is positioned near the automated EVSE system 200. The wheels stops may limit forward motion of the vehicle 112. The wheel stops may include sensors (e.g., pressure sensors) that are configured to provide a signal when the wheels are in contact with the wheel stops. The wheel stops may be adjustable in a lateral direction and/or a longitudinal direction to allow for proper alignment of the charge connectors.

The automated EVSE system 200 may include a lateral movement mechanism 242 that is configured to move the telescopic charge connector mechanism 230 in a lateral direction (e.g., wheel-to-wheel movement). The lateral movement mechanism 242 may facilitate positioning the telescopic charge connector mechanism 230 for coupling with the vehicle charge connector 210. The lateral movement mechanism 242 may include an electric actuator (e.g., electric motor) that is driven by the EVSE ECU 201. The lateral movement mechanism 242 may be a rack and pinion mechanism. For example, the rack may be attached to a platform to which the telescopic charge connector mechanism 230 is attached and the pinion may be coupled to the electric actuator. In some configurations, the lateral movement mechanism 242 may be a movable or sliding platform upon which the telescoping charge connector mechanism 230 is positioned. In some configurations, the lateral movement mechanism 242 may be manually positioned by a user. For example, the lateral movement mechanism 242 may allow the user to position the telescopic charge connector mechanism 230 in a position for charging a particular vehicle.

The automated EVSE system 200 may further include an auto-disengage feature that is configured to detect if the vehicle is about to move during charging. This prevents issues with the automated EVSE system 200 that could be caused by driving away during charging. The vehicle charge control module 206 and the EVSE ECU 201 may exchange messages via a wireless communication channel. The vehicle charge control module 206 may send information such as ignition status (e.g., RUN, OFF, ACCESSORY) and gear status (e.g., PARK, DRIVE, REVERSE). The EVSE ECU 201 may receive the signals and determine if charging should be stopped. For example, responsive to receiving a gear status that changes from PARK, the EVSE ECU 201 may terminate charging and retract the telescoping charge connector mechanism 230 to disengage the vehicle 112 and the automated EVSE system 200.

The automated EVSE system 200 may include additional features to detect the presence of the vehicle 112. Various sensors may be included for lateral location of the vehicle when it is positioned near the automated EVSE system 200. For example, a sensor 240 may be present for identifying the presence and position of the vehicle 112 parked at the automated EVSE system 200. The sensor 240 may be an ultrasonic sensor. The sensor 240 may provide a signal to the EVSE ECU 201. For example, the sensor 240 may be located on a surface of the housing. The sensor 240 may be configured to return a signal indicative of a relative distance of a tire that is proximate the wheel stop. The sensor 240 may provide a signal to the EVSE ECU 201. The signal may be used to derive a lateral distance that the telescopic charge connector mechanism 230 should be moved to align with the vehicle charge connector 210. The EVSE ECU 201 may operate the lateral movement mechanism 242 to position the telescopic charge connector mechanism 230 in the desired position.

Figure 3:
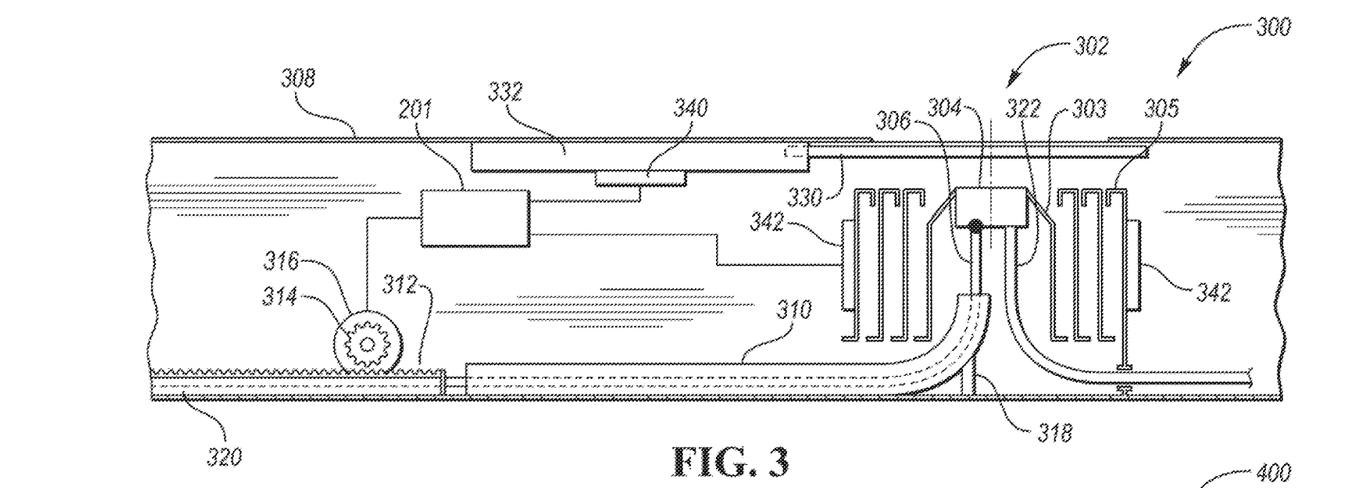
FIG. 3 depicts a first configuration for an automated vehicle charging system with a telescoping arm.

FIG. 3 depicts a first configuration 300 for actuating a telescoping arm 302 as may be included in the automated EVSE system. The telescoping arm 302 may include a center segment 303 that includes a charge connector 304. The center segment 303 may be hollow to define a cavity within. The telescoping arm 302 may include a number of concentric segments that are configured to move vertically as the segment contained within has traveled a maximum distance. For example, as the center segment 303 is raised a bottom tab or flange may contact an upper flange of the adjacent segment causing the adjacent segment to rise. This may continue until a fixed outer segment 305 limits the total travel. The fixed outer segment 305 may be coupled to a charge station housing 308. In other configurations, the fixed outer segment 305 may be coupled to a sliding platform that permits lateral movement of the telescoping arm 302. A top surface of the center segment 303 may define a sloped surface for cooperating with the charge connector guide 212 of the vehicle 112 to guide the charge connector 304 to the underside charge port 210.

The telescoping arm 302 may be moved vertically by application of a force to the center segment 303. A connecting member 306 may be coupled at one end to the charge connector 304 or the center segment 303. The connecting member 306 may be coupled at another end to a rack 312. Motion of the rack 312 may be caused by a pinion 314 that is connected to an electric motor 316 that is controlled by the EVSE ECU 201. The connecting member 306 may be configured to resist compression in an axial direction while being pliable in a radial direction. As such, the connecting member 306 is configured to transfer a force from the rack 312 to the center segment 303 to facilitate raising the telescoping arm 302. The connecting member 306 may be referred to as a bendable or flexible connecting member.

The system 300 may further include a guide element 310 that is configured to guide the connecting member 306 and a portion of the rack 312 during operation. The guide element 310 may be configured to constrain the connecting member 306 to traveling in a predetermined path that includes directing the connecting member 306 from traveling in a same direction as the rack 312 to traveling in the direction of motion of the telescoping mechanism 302. The guide element 310 may be an enclosed tube or conduit sized to allow movement of the connection member 306 within. In some configurations, the guide element 310 may define a channel that is not fully enclosed. The guide element 310 may include a bend region that transfers a direction of travel of the connecting member 306 from horizontal to vertical. The guide element 310 may be attached to the charge station housing 308 by one or more brackets/supports 318 to prevent movement of the guide element 310. A portion of the guide element 310 may define an arcuate path for the connecting member 306. A cross-section of the guide element 310 may define an enclosed surface to encircle the connecting member 306.

In operation, the pinion 314 is driven to cause the rack 312 to move horizontally. Horizontal motion of the rack 312 is translated to vertical motion of the center segment 303 by the attached connecting member 306 moving through the guide element 310. The connecting member 306 may bend when passing through the bend region of the guide element 310. The connecting member 306 may have a generally round or circular cross section.

The connecting member 306 may be constructed of plastic, nylon, or other material capable of bending or flexing in the bend region of the guide element 310. The connecting member 306 may be a cable comprised of strands of metal wire (e.g., stranded cable). The connecting member 306 may be attached to the center segment 303 or charge connector 304 with a bracket and/or fastener. The attachment may be also be made using an adhesive or epoxy. The connecting member 306 may be attached to the rack 312 using a bracket and/or fastener. In some configurations, a coupling element may be used to attach the connecting member 306 to the rack 312.

The system may include a rack guide 320 that is configured to cooperate with the rack 312 to constrain or limit the motion of the rack 312 to a single axis of motion (e.g., horizontal direction). The rack 312 may be constructed to include non-toothed regions on each side of the toothed area. The rack guide 320 may define a channel on each side of the rack 312 to receive the non-toothed regions. The channels of the rack guide 320 may limit movement of the rack 312 to a single axis (e.g., horizontal). In some configurations, the guide element 310 may include channels to receive the non-toothed regions to constrain the rack 312 while extended into the guide element 310. In some configurations, the rack guide 320 may fully enclose the rack 312 except for defining an opening for the pinion 314 to engage the teeth of the rack 312. The rack 312 may be constructed of a rigid material such as metal or plastic.

A wiring cable 322 may include the electrical conductors for coupling to the charge connector 304. The electrical conductors of the wiring cable 322 may be connected to corresponding pins or ports of the charge connector 304. During operation the wiring cable 322 may be extended and retracted according to the height of the telescoping arm 302. The charge station housing 308 may include a chamber for storing the wiring cable 322 when the telescoping arm 302 is retracted. In some configurations, the charge station housing 308 may include a spooling mechanism to wind and unwind the wiring cable 322 as the telescoping arm 302 is lowered and raised.

The charging system may include a door panel 330 that is configured to open and close to expose and cover the telescoping arm 302. One or more door panel guides 332 may be attached to the housing 308. For example, door panel guides 332 may be installed on each side of the door panel 330 and define slots in which the door panel 330 moves.

The system may further include one or more heating elements that are positioned to heat portions of the charging system. A first heating element 340 may be installed proximate the door panel 330 and/or door panel guides 332. The first heating element 340 may be operated to prevent freezing and/or thaw frozen water that could impede motion of the door panel 330.

The system may further include a second heating element 342 that is installed proximate to the telescoping arm 302. For example, the second heating element 342 may wrap around the outer surface of the fixed segment 305 to distribute heat around the telescoping arm 302 when activated. In other configurations, the second heating element 342 may be installed within the cavity defined by the telescoping arm 302.

The EVSE ECU 201 may be configured to detect when the telescoping arm 302 motion is limited. The EVSE ECU 201 may monitor a current supplied to the electric motor 316. If the telescoping arm 302 is unable to move, the current may increase above a threshold. The EVSE ECU 201 may stop providing when the current rises above the threshold. The threshold may be configured to detect a stall condition of the electric motor 316. When the telescoping arm 302 is extended and the charge connector 304 engages the vehicle plug, the telescoping arm 302 may be unable to extend further. The EVSE ECU 201 may also monitor the charging-related signals from the charge connector 304 to determined when to stop extending the telescoping arm 302.

The charging system may include a telescoping mechanism 302 that is configured to vertically lift a conduction charge connector 304. The charging system may include a rack 312 configured to move generally perpendicular to a direction of motion of the telescoping mechanism 302. The charging system may include a connecting member 306 coupled to the rack 312 and the telescoping mechanism 302. The charging system may include a guide configured to direct the connecting member 306 from traveling in a same direction as the rack 312 to traveling in a direction of motion of the telescoping mechanism 302. The charging system may include an electric motor 316 coupled to a pinion 314 that cooperates with the rack 312 to move the rack 312. The charging system may include a controller 201 programmed to operate the electric motor 316 to move the telescoping mechanism 302.

The charging system may further include a door mechanism 330 configured to cover the conductive charge connector 304 when the telescoping mechanism 302 is in a retracted position. The charging system may further include an electrical actuator coupled to the door mechanism 330 and electrically coupled to the controller 201. The charging system may further include a heating element 340 that is configured to provide heat to movable portions of the door mechanism 330. A segment of the of the telescoping mechanism 302 that includes the conductive charge connector 304 may have sloped sides to cooperate with a connector guide 212 of the vehicle 112. The charging system may further include a heating element 342 that is configured to provide heat to movable portions of the telescoping mechanism 302 when activated.

Figure 4:
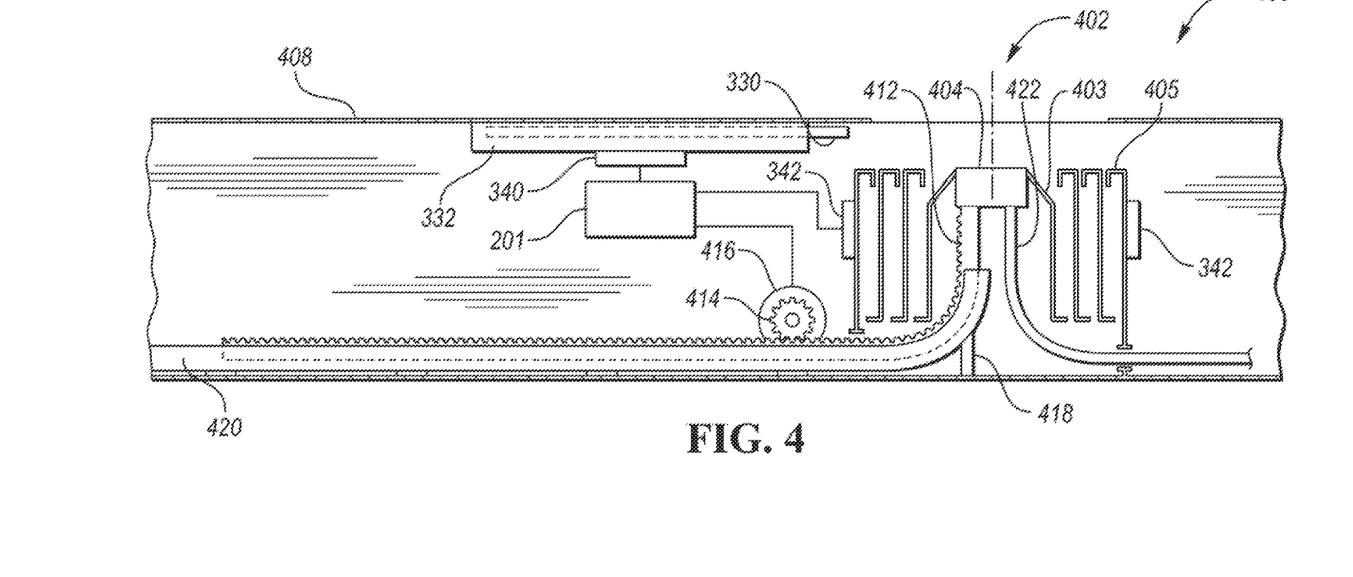
FIG. 4 depicts a second configuration for an automated vehicle charging system with a telescoping arm.

FIG. 4 depicts a second configuration 400 for actuating a telescoping arm 402 as may be included in the automated EVSE system. The telescoping arm 402 may include a center segment 403 that includes a charge connector 404. The center segment 403 may be hollow to define a cavity within. The telescoping arm 402 may include a number of concentric segments that are configured to move vertically as the segment contained within has traveled a maximum distance. For example, as the center segment 403 is raised a bottom tab or flange may contact an upper flange of the adjacent segment causing the adjacent segment to rise. This may continue until a fixed outer segment 405 limits the total travel. The fixed outer segment 405 may be coupled to a charge station housing 408 or a sliding platform. A top surface of the center segment 403 may defined a sloped surface for cooperating with the charge connector guide 212 of the vehicle 112 to guide the charge connector 404 to the underside charge port 210.

The telescoping arm 402 may be moved vertically by application of a force to the center segment 403. A bendable rack element 412 may be coupled at one end to the charge connector 404 or the center segment 403. Motion of the bendable rack element 412 may be caused by a pinion 414 that is connected to an electric motor 416 that is controlled by the EVSE ECU 201. The bendable rack element 412 may be configured to resist compression in an axial direction while being pliable in a radial direction. As such, the bendable rack element 412 is configured to transfer a force applied from the pinion 414 to the center segment 403 to facilitate raising the telescoping arm 402.

The system may include a rack guide 420 that is configured to constrain movement of the bendable rack element 412 to a predetermined path. The bendable rack element 412 may be constructed to include non-toothed regions on each side of the toothed area. The rack guide 420 may define a channel on each side of the bendable rack element 412 to receive the non-toothed regions. The channels of the rack guide 420 may limit movement of the bendable rack element 412 to a predetermined path. In some configurations, the rack guide 420 may fully enclose the bendable rack element 412 except for defining an opening for the pinion 414 to engage the teeth of the bendable rack element 412. The bendable rack element 412 may be constructed of a pliant or flexible material such as metal, plastic, nylon, or similar materials. The rack guide 420 may include a bend region that transfers a direction of travel of the bendable rack element 412 from a horizontal direction to a vertical direction. The rack guide 420 may be attached to the charge station housing 408 to prevent movement of the rack guide 420. For example, the rack guide 420 may be attached to the charge station housing 408 with one or more support brackets 418. A portion of the rack guide 420 may define an arcuate path in the bend region for the bendable rack element 412. The rack guide 430 may encircle at least a portion of the bendable rack element 412.

In operation, the pinion 414 is driven to cause the bendable rack element 412 to move within the predetermined path defined by the rack guide 420. Horizontal motion of the bendable rack element 412 at the pinion is translated to vertical motion of the center segment 403. The bendable rack element 412 may bend or flex when passing through the bend region of the rack guide 420.

A wiring cable 422 may include the electrical conductors for coupling to the charge connector 404. The electrical conductors of the wiring cable 422 may be connected to corresponding pins or ports of the charge connector 404. During operation the wiring cable 422 may be extended and retracted according to the height of the telescoping arm 402. The charge station housing 408 may include a chamber for storing the wiring cable 422 when the telescoping an 402 is retracted. In some configurations, the charge station housing 408 may include a spooling mechanism to wind and unwind the wiring cable 422 as the telescoping arm 402 is lowered and raised.

The charging system may include the door panel 330 that is configured to open and close to expose and cover the telescoping arm 402. One or more door panel guides 332 may be attached to the housing 408. The system may further include one or more heating elements that are positioned to heat portions of the charging system. A first heating element 340 may be installed proximate the door panel 330 and/or door panel guides 332. The first heating element 340 may be operated to prevent freezing and/or thaw frozen water that could impede motion of the door panel 330.

The system may further include a second heating element 342 that is installed proximate to the telescoping arm 402. For example, the second heating element 342 may wrap around the outer surface of the fixed segment 405 to distribute heat around the telescoping arm 402 when activated. In other configurations, the second heating element 342 may be installed within the cavity defined by the telescoping arm 402.

A charging system may include a telescoping mechanism 402 configured to vertically lift a conductive charge connector 404. The charging system may include an electric motor 416 coupled to a pinion 414. The charging system may include a bendable rack 412, cooperating with the pinion 414 to move the bendable rack 412, coupled to the telescoping mechanism 402 such that the telescoping mechanism 402 moves as the bendable rack 412 moves. The charging system may include a guide 420 configured to direct the bendable rack 412 from traveling in a horizontal direction to traveling in the direction of motion of the telescoping mechanism 402. The charging system may include a controller 201 programmed to operate the electric motor 416 to move the telescoping mechanism 402.

The charging system may further include a door mechanism 330 configured to cover the conductive charge connector 404 when the telescoping mechanism 402 is in a retracted position. The charging system may further include an electrical actuator coupled to the door mechanism 330 and electrically coupled to the controller 201. The charging system may further include a heating element 340 that is configured to provide heat to movable portions of the door mechanism 330. A segment of the of the telescoping mechanism 402 that includes the conductive charge connector 404 may have sloped sides to cooperate with a connector guide 212 of the vehicle 112. The charging system may further include a heating element 342 that is configured to provide heat to movable portions of the telescoping mechanism 402 when activated.

The systems depicted in FIG. 3 and FIG. 4 may be similar in operation. FIG. 3 depicts the door panel 330 in a closed position and FIG. 4 depicts the door panel 330 in an open position. The configurations may differ in the placement of the electric motor for driving the pinion of the rack mechanism. The configuration of FIG. 4 may allow the electric motor to be installed closer to the telescoping arm mechanism. The configuration of FIG. 3 allows for the use of a solid rack mechanism which may improve durability as the rack is not bent during operation.

Figure 7:
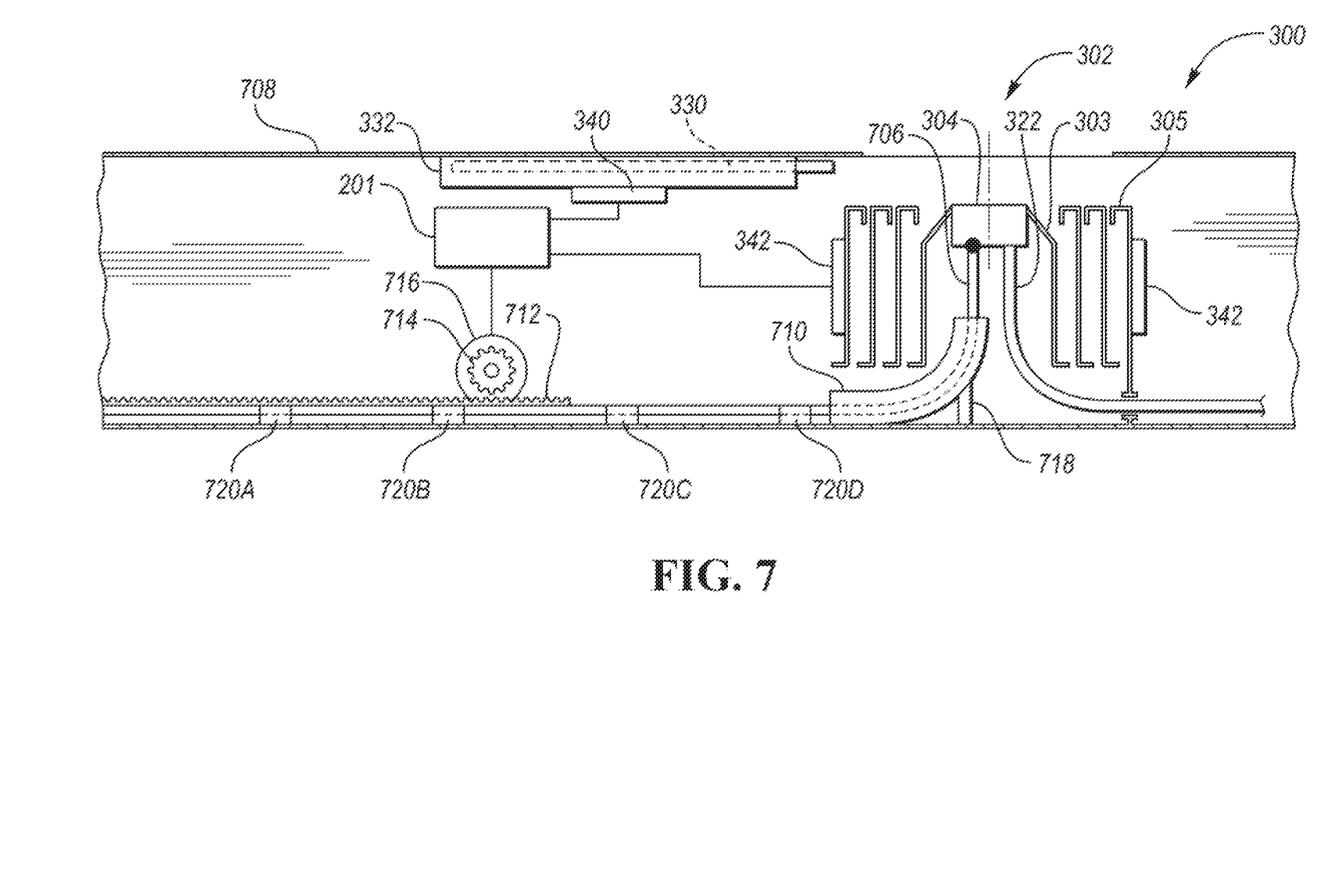
FIG. 7 depicts a third configuration for an automated vehicle charging system with a telescoping arm.

FIG. 7 depicts a third configuration for actuating a telescoping arm 302 as may be included in the automated EVSE system. Elements labeled similar to FIG. 3 may function as described previously herein with respect to FIG. 3. The telescoping arm 302 may be moved vertically by application of a force to the center segment 303. A connecting member 706 may be coupled at one end to the charge connector 304 or the center segment 303. The connecting member 706 may be coupled at another end to a rack 712. In this configuration, the connecting member 706 may be attached to an underside or bottom surface of the rack 712 along a length of the rack 712. The connecting member 706 may be attached using an epoxy or adhesive and/or using fasteners, clamps, or brackets.

Motion of the rack 712 may be caused by a pinion 714 that is connected to an electric motor 716 that is controlled by the EVSE ECU 201. The connecting member 706 may be configured to resist compression in an axial direction while being pliable in a radial direction. As such, the connecting member 706 is configured to transfer a force from the rack 712 to the center segment 303 to facilitate raising the telescoping arm 302. The connecting member 706 may be referred to as a bendable or flexible connecting member.

The system may further include a guide channel 710 that is configured to guide the connecting member 706 during operation. The guide channel 710 may be configured to constrain the connecting member 706 to traveling in a predetermined path that includes directing the connecting member 706 from traveling in a same direction as the rack 712 to traveling in the direction of motion of the telescoping mechanism 302. The guide channel 710 may be an enclosed tube or conduit sized to allow movement of the connection member 706 within. In some configurations, the guide channel 710 may define a channel that is not fully enclosed. The guide channel 710 may include a bend region that transfers a direction of travel of the connecting member 706 from horizontal to vertical. The guide channel 710 may be attached to the charge station housing 708 by one or more brackets/supports 718 to prevent movement of the guide channel 710. A portion of the guide channel 710 may define an arcuate path for the connecting member 706. A cross-section of the guide channel 710 may define an enclosed surface to encircle the connecting member 706.

The system may include guide elements 720 that are configured to cooperate with the connecting member 706 to limit motion of the rack 712 to a single axis of motion. The connecting member 706 may define slots along a length of the connecting member 706 that are configured to cooperate with the guide elements 720 to constrain the connecting member 706 to a predetermined path of travel. Since the connecting member 706 is firmly attached to a length of the rack 712, the rack 712 is constrained to travel in a same direction as the connecting member 706. The guide elements 720 may be brackets or pins that define flanges or tabs that are received by the slots of the connecting member 706. In other configurations, the guide elements 720 may be define slots for receiving a raised portion (e.g., tabs or flanges) formed along sides of the connecting member 706. The guide elements 720 may be positioned such that at maximum lift of the telescoping mechanism 302, the connecting member 706 maintains contact with all of the guide elements 720. This may prevent any of the guide elements 720 from losing contact with the connecting member 706 which could cause issues when reversing the direction of motion. In addition, the guide elements 720 may be arranged to ensure that the pinion 714 and the rack 712 maintain contact. For example, one or more of the guide elements 720 may be placed near the pinion 714 to support the rack 712 in the region of the pinion 714.

Figure 5:
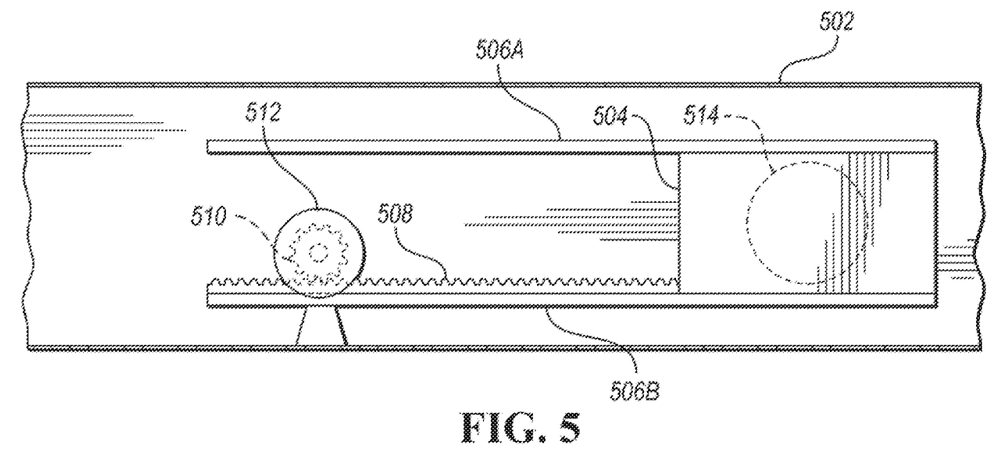
FIG. 5 depicts a possible configuration for a door mechanism for an automated vehicle charging system that is in a closed position.
Figure 6:
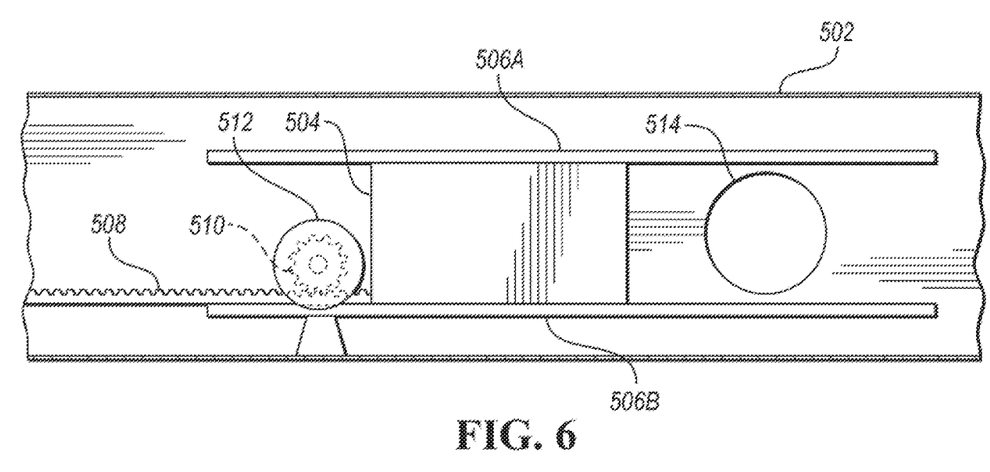
FIG. 6 depicts a possible configuration for a door mechanism for an automated vehicle charging system that is in an open position.

FIG. 5 depicts a door mechanism in the closed position. A door panel 504 may be positioned to cover an opening 514 for telescoping arm 302 in the closed position. The door mechanism may include a pair of door rails 506 that are coupled to a charge station housing 502 and configured to allow movement of the door panel 504 along a predetermined axis of travel. For example, the door rails 506 may define grooves or slots into which the door panel 504 may be inserted. The door mechanism may further include a rack 508 that is coupled to the door panel 504. The rack 508 may cooperate with a pinion 510 that is driven by an electric motor 512 to move the door panel 504. The electric motor 512 may be coupled to the housing 502 by a bracket or other mechanism. FIG. 6 depicts the door mechanism in the open position. In the open position, the opening 514 for the telescoping arm 302 is exposed and the telescoping arm 302 may be raised without interference from the door panel 504. The door mechanism may include sealing elements (e.g., gaskets) to prevent water seeping into the housing 502 when the door panel 504 is in the closed position.

In the above configurations, the segments of the telescoping arm (302, 402) may be constructed of a lightweight material such as plastic and/or thin metal to reduce the amount of weight that is raised. The combined weight of the segments and charge connector may be considered when selecting the size of the rack elements and/or connecting member.

The charging system may include one or more wheel stops or catches that are coupled to the charge station housing. The wheels stops may be an area at which the wheels of the vehicle contact the charging station to prevent further forward motion. The wheel stops may be adjustable to adjust the position of the telescoping arm relative to the underside charge port of the vehicle. The adjustment may be configured to align the telescoping arm and the underside charge port in at least the direction of vehicle motion. In addition, the wheel stops may be adjustable in a wheel-to-wheel direction to adjust for the width of the vehicle. The wheel stops may include a rounded or tire-shaped area for contacting the wheel. The rounded area may aid in locating the wheels within the wheel stops at a consistent position. The wheel stops may include a sensor for detecting the presence of a vehicle. For example, pressure sensors may be installed on a face of the wheel stops that contact the tires.

Referring again to FIG. 2, the charging system may be positioned on the ground in a parking space or garage. The vehicle 112 may be driven up to the charging system either manually or via an active park system. The vehicle 112 may move forward toward the automated EVSE system 200. The wheel catches may guide the vehicle 112 into a proper longitudinal position for charging. The automated EVSE system 200 may detect that the vehicle 112 is in position via the sensor 240. One of the sensors may be configured to indicate a lateral position of the vehicle relative to the telescoping arm 230. The sensor 240 may provide a lateral offset (e.g., right or left direction) to operate the lateral positioning mechanism 242. The EVSE ECU 201 may operate the lateral positioning mechanism 242 according to the lateral offset.

Responsive to the sensors 240 indicating that the vehicle 112 is in position, the EVSE ECU 201 may open the door panel 236 so that the telescoping arm 230 may be raised. The vehicle charge controller 206 may operate the underside door panel 220 to the open position. The EVSE ECU 201 may then cause the telescoping arm 230 to be raised. The telescoping arm 230 may be raised until the charge connector 232 makes full contact with the vehicle underside charge port 210. When the electrical connections are completed, charging may take place via the SAE J1772 protocol.

The automated EVSE system 200 may be configured to detect a drive-away condition. Responsive to detecting the drive-away condition, the EVSE ECU 201 may terminate charging and lower the telescoping arm 230. A drive-away condition may be detected via the wheel stop pressure sensors (e.g., a decreasing in pressure exceeding a threshold). A drive-away condition may also be detected by a loss of signal (e.g., proximity, pilot) from the charge connector 232. In some configurations in which a communication link is established between the vehicle 112 and the automated EVSE system 200, information such as transmission gear and ignition status may be transferred to the charging station.

The EVSE ECU 201 may also operate the heating elements 234. The automated EVSE system 200 may include a temperature sensor configured to measure a temperature of the environment proximate the automated EVSE system 200. If the temperature is less than a temperature at which water would freeze, the EVSE ECU 201 may be programmed to activate the heating elements 234 for a predetermined duration before initiating a charge cycle and/or causing movement of the door and telescoping arm. The heating elements 234 may be configured to provide heat to portions of the door mechanism 236 and/or the telescoping mechanism 230 that could prevent movement in a presence of frozen water.

The automated EVSE system 200 may be configured to terminate charging and lower the telescoping arm 230 responsive to charge completion. Charge completion may be detected by monitoring the SAE J1772 communication. In some configurations in which a communication link is established between the vehicle 112 and the automated EVSE system 200, information such as battery state of charge and charging status may be transferred to the charging station.

A benefit of the ground-based charging system disclosed herein is that there is no need for below-ground storage for components. The charging components are entirely contained in the above-ground unit that can be placed anywhere on the ground. As such, the ground-based charging system can be easily moved and repositioned with ease without modifying the underlying surface. In addition, the charging system maintains a low profile to support charging of a variety of vehicles.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A charge station for a vehicle comprising:
   a telescoping mechanism configured to direct a conductive charge connector in a vertical direction;
   a rack configured to move generally perpendicular to a direction of motion of the telescoping mechanism;
   a bendable connecting member coupled to the rack and the telescoping mechanism;
   a guide element configured to constrain the bendable connecting member to traveling in a predetermined path that includes directing the bendable connecting member from traveling in a same direction as the rack to traveling in the direction of motion of the telescoping mechanism;
   an electric motor coupled to a pinion that cooperates with the rack to move the rack; and
   a controller programmed to operate the electric motor to move the telescoping mechanism.

2. The charge station of claim 1 wherein the bendable connecting member is coupled to a bottom surface of the rack over a predetermined length of the rack and is configured to cooperate with the guide element to limit motion of the rack to a single axis of motion.

3. The charge station of claim 2 wherein the bendable connecting member defines slots along a length of the bendable connecting member and the guide element includes one or more brackets that cooperate with the slots to constrain the bendable connecting member to the predetermined path.

4. The charge station of claim 1 wherein at least a portion of the guide element defines an arcuate path for the bendable connecting member.

5. The charge station of claim 1 wherein at least a portion of the guide element is a conduit that surrounds the bendable connecting member.

6. The charge station of claim 1 further comprising a rack guide that is configured to cooperate with the rack to limit motion of the rack to a single axis of motion.

7. The charge station of claim 1 wherein a segment of the of the telescoping mechanism that includes the conductive charge connector has sloped sides to cooperate with a connector guide of a vehicle.

8. The charge station of claim 1 further comprising a heating element that is configured to provide heat, when activated, to portions of the telescoping mechanism that could prevent movement in a presence of frozen water.

9. The charge station of claim 1 wherein the bendable connecting member is a stranded cable.

10. The charge station of claim 1 wherein the bendable connecting member is plastic.

11. A charging system for a vehicle comprising:
    a telescoping mechanism configured to direct a conductive charge connector in a vertical direction;
    an electric motor coupled to a pinion;
    a bendable rack coupled at a first end to the telescoping mechanism and configured to cooperate with the pinion;
    a rack guide configured to constrain the bendable rack to traveling in a predetermined path that includes directing the bendable rack from traveling in a horizontal direction at the pinion to traveling in the vertical direction at the first end such that the telescoping mechanism moves in the vertical direction as the bendable rack moves; and
    a controller programmed to operate the electric motor to move the telescoping mechanism.

12. The charging system of claim 11 wherein the bendable rack is plastic.

13. The charging system of claim 11 wherein the rack guide defines an arcuate path for the bendable rack.

14. The charging system of claim 11 wherein the rack guide encircles at least a portion of the bendable rack.

15. The charging system of claim 11 wherein a segment of the of the telescoping mechanism that includes the conductive charge connector has sloped sides to cooperate with a connector guide of a vehicle during deployment of the telescoping mechanism.

16. The charging system of claim 11 further comprising a heating element configured to provide heat to movable portions of the telescoping mechanism when activated.

17. An above-ground charging system for a vehicle comprising:
    a telescoping mechanism configured to direct a conductive charge connector in a vertical direction;
    a rack configured to move generally perpendicular to a direction of motion of the telescoping mechanism;
    a bendable connecting member coupled to the rack and the telescoping mechanism;
    a conduit surrounding at least a portion of the bendable connecting member and configured to direct the bendable connecting member from traveling in a same direction as the rack to traveling in the direction of motion of the telescoping mechanism;

an electric motor coupled to a pinion that cooperates with the rack to cause movement of the rack;

a heating element disposed proximate the telescoping mechanism and configured to provide heat, when activated, to portions of the telescoping mechanism that could prevent movement in a presence of frozen water;

a movable door coupled to an electrical actuator and configured to cover the conductive charge connector when the telescoping mechanism is in a retracted position; and a controller programmed to operate the heating element, electrical actuator, and the electric motor to position the conductive charge connector to charge a vehicle responsive to a demand for vehicle charging.

18. The above-ground charging system of claim 17 further comprising guide rails configured to limit lateral motion of the rack to maintain contact between the pinion and teeth of the rack.

19. The above-ground charging system of claim 17 wherein a segment of the of the telescoping mechanism that includes the conductive charge connector has sloped sides to cooperate with a connector guide of a vehicle during deployment of the telescoping mechanism.

20. The above-ground charging system of claim 17 wherein the conduit defines an arcuate path for the bendable connecting member.

* * * * *